United States Patent [19]
Berdan et al.

[11] Patent Number: 5,353,571
[45] Date of Patent: Oct. 11, 1994

[54] MOUNTING OF BODY MOULDING AND RELATED ASSEMBLIES

[75] Inventors: Karl Berdan; Luis Mendes, both of Ontario, Canada

[73] Assignee: Pebra, Inc., Ontario, Canada

[21] Appl. No.: 889,702

[22] Filed: May 29, 1992

[30] Foreign Application Priority Data

May 29, 1991 [GB] United Kingdom ............... 9111491

[51] Int. Cl.$^5$ .............................................. B60J 1/00
[52] U.S. Cl. .................... 52/716.5; 52/716.7; 52/716.6; 52/718.04; 52/718.05; 24/293
[58] Field of Search ............. 52/718.04, 716.5, 716.6, 52/716.7, 717.10 R, 718.03, 718.05, 718.06, 287.1; 24/293, 294, 297, 662, 669

[56] References Cited

U.S. PATENT DOCUMENTS

| 2,414,986 | 1/1947 | Tinnerman | 24/293 |
|---|---|---|---|
| 3,110,068 | 11/1963 | Perrochat | 52/716.6 |
| 3,422,502 | 1/1969 | McCarthy | 24/669 |
| 3,445,979 | 5/1969 | Meyer | 52/718.04 |
| 4,066,285 | 1/1978 | Hall et al. | |
| 4,268,079 | 5/1981 | Nomura et al. | 52/716.7 |
| 4,579,493 | 4/1986 | Schäty | 24/662 |
| 4,728,236 | 3/1988 | Kraus | 24/662 |
| 4,838,004 | 6/1989 | Adell | 52/716.6 |
| 4,856,253 | 8/1989 | Jon | 52/718.05 |
| 4,904,014 | 2/1990 | Azarovitz et al. | 52/716.7 |
| 4,986,332 | 1/1991 | Lanuza | 52/718.05 |
| 5,096,753 | 3/1992 | McCue et al. | 52/718.04 |
| 5,106,223 | 4/1992 | Kraus | 24/669 |
| 5,110,650 | 5/1992 | Kessler | 52/718.04 |
| 5,155,952 | 10/1992 | Herwegh et al. | 52/717.01 |

FOREIGN PATENT DOCUMENTS

| 0387421 | 9/1990 | European Pat. Off. | 52/718.05 |
|---|---|---|---|
| 2512171 | 3/1983 | France . | |

Primary Examiner—Carl D. Friedman
Assistant Examiner—Wynn Wood
Attorney, Agent, or Firm—Keck, Mahin & Cate

[57] ABSTRACT

A system for attaching a trim piece to a panel of, for example, a vehicle, includes a cover and a retaining strip forming the trim piece and adhesive to secure the retaining strip to the panel. The cover includes a set of formations that engage with a complementary set on the retaining strip allowing the adhesive to hold both on the panel. The cover may be removed without removing the retaining strip.

10 Claims, 6 Drawing Sheets

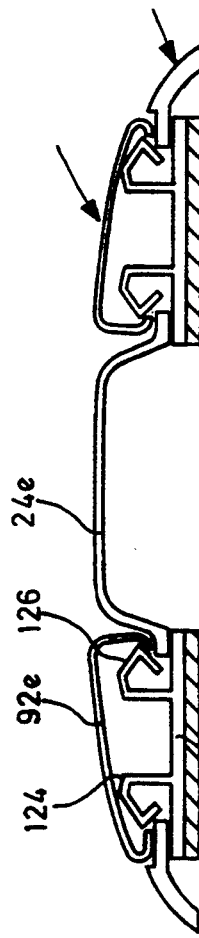
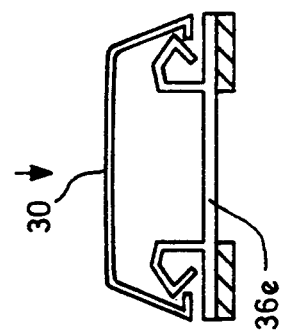
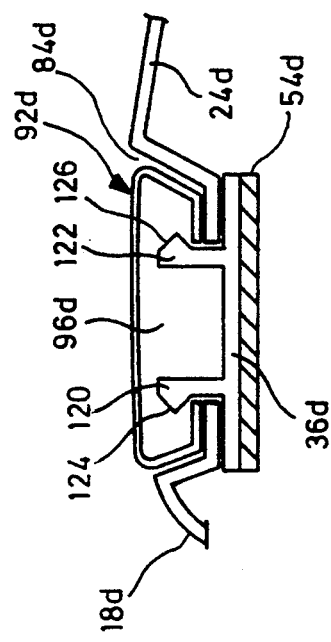
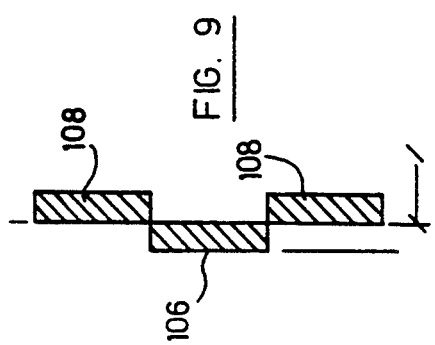

MOUNTING OF BODY MOULDING AND RELATED ASSEMBLIES

The present invention relates to a fastening system and in particular a fastening system for attaching trim to a panel.

It is relatively common in automobiles to have trim attached to the panels of the vehicle for protection or for cosmetic purposes. Typically, a piece of trim might include an elongate horizontal strip attached to the waistline of the vehicle to prevent minor damage caused by impacts from the doors of other cars. Trim is also used to alter the appearance of a vehicle by, for example, attaching molded pieces to the lower portions of the vehicle to provide an aerodynamic effect. These panels are essentially cosmetic although may also offer superficial protection from minor impacts such as stones or other debris.

The normal procedure for attaching the trim to the panels is to provide a two-piece clip, one part of which is attached to the trim and the other part of which is secured to the panel. The other part is secured to the panel by studs that are welded during manufacture to the panel. In a typical assembly operation, the one part of the clip must be secured to the trim in the correct location, the other part of the clip must be secured to the weld studs, and the two must then be assembled. This procedure is relatively complicated and requires some care to achieve an acceptable finished product. Moreover, because the studs determine the position of the trim on the panel and alignment between adjacent pieces of trim is essential, considerable care must be taken in initial positioning of the studs and adjustment of the panels of the vehicle so that alignment of the studs is obtained. This procedure therefore is relatively time consuming, costly and requires careful monitoring to achieve an acceptable product.

It has also been proposed to adhere directly the trim to a panel. The difficulty with this arrangement is that the trim may become damaged and cannot then be removed. Thus, the vehicle either has to operate with a damaged trim piece or the whole panel has to be replaced to provide the desired appearance.

It is therefore an object of the present invention to obviate or mitigate the above disadvantages.

According to the present invention, there is provided a system for attaching trim to a panel comprising a first set of formations integrally formed on a side of the trim to be placed against the panel, a retaining strip including a second set of formations complementary to the first and adapted to engage releasably the first set of formations, a planar surface on said retaining strip directed oppositely to the second set of formations and an adhesive strip secured to the planar surface and having an outer adhesive surface directed toward the panel to which the trim is to be attached.

Embodiments of the invention will now be described by way of example only with reference to the accompanying drawings in which:

FIG. 9 is a view on the line 9—9 of FIG. 8.

FIG. 10 is a view similar to FIG. 8 showing an alternative configuration.

FIG. 11 is a view similar to FIG. 8 showing a yet further configuration.

FIG. 12 is a view similar to FIG. 8 showing a still further embodiment.

Figure 1:
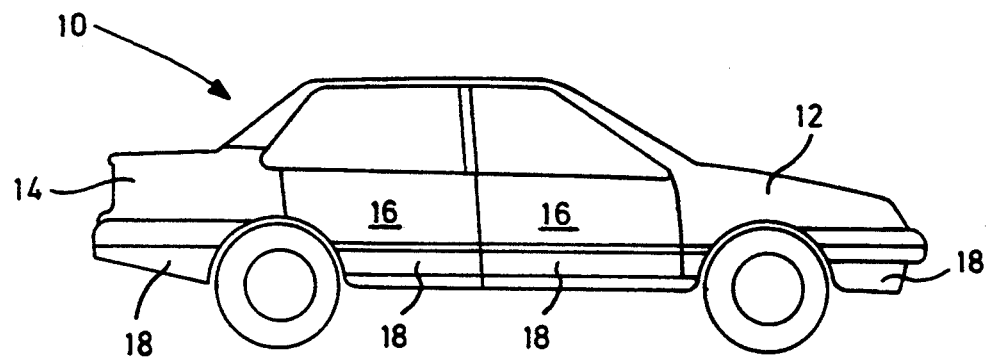
FIG. 1 is a side view of a motor vehicle.

Referring firstly to FIG. 1, a vehicle 10 includes front and rear body panels 12,14 and a pair of doors including door panels 16. Attached to the lower edge of the door panels 16 and body panels 12,14 are trim pieces 18 that provide some protection against minor impacts and are utilized to provide the desired overall appearance of the vehicle.

Figure 3:
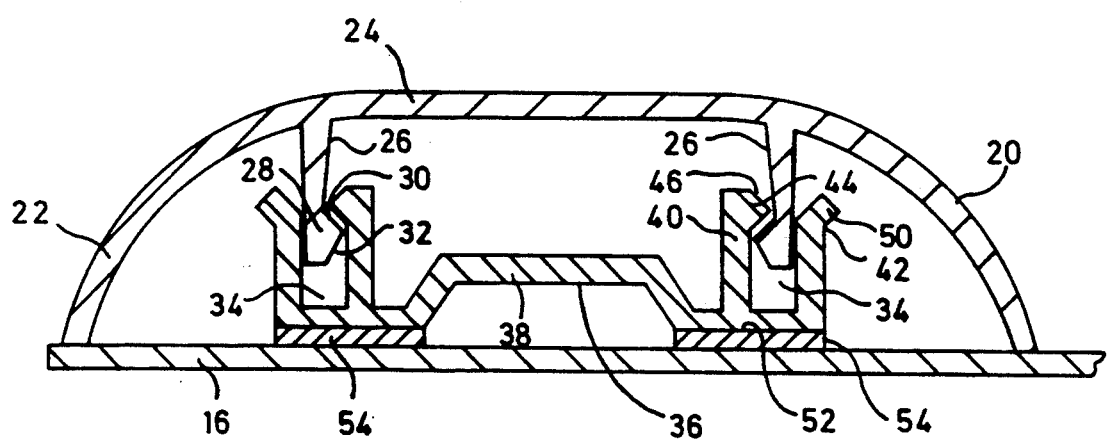
FIG. 3 is a view on the line 3—3 of FIG. 2.
Figure 2:
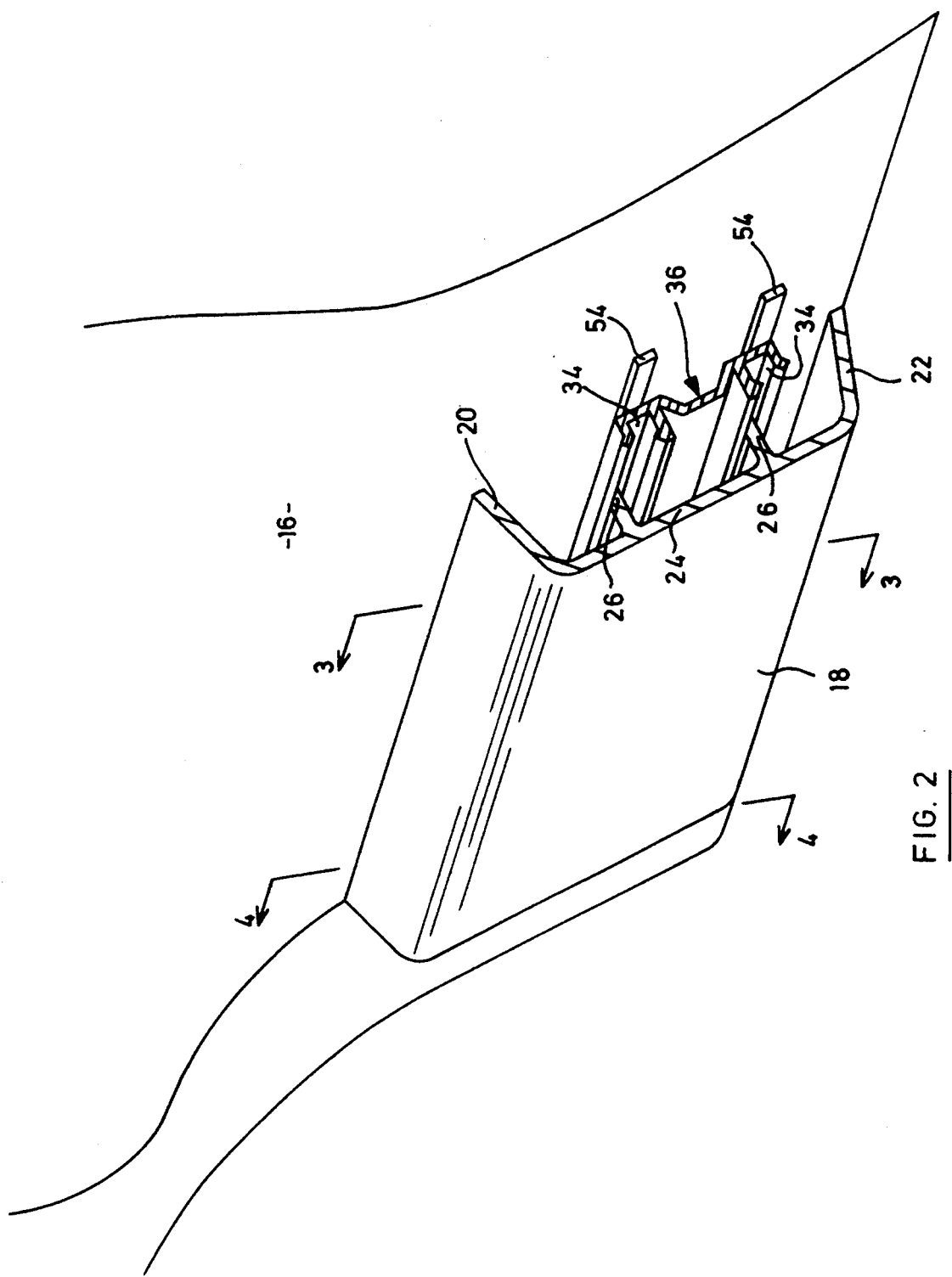
FIG. 2 is a perspective view of a portion of the motor vehicle within the circle 2 of FIG. 1 with portion removed for clarity.

As may be seen in FIG. 2, trim pieces 18 are made up of two plastic extrusions 19,36 which combine to provide the required outer contour. The outer cover 19 of trim pieces 18 has side flanges 20,22 extending on either side of a body portion 24 and into engagement with the outer surface of door panel 16. The inner surface of the cover 19 has a pair of legs 26 projecting toward the body panel 16 and having an enlarged head 28 at the lower end. In the embodiment shown in FIG. 3, the head 28 is formed as a triangular projection to one side of the leg 26 with upper and lower inclined surfaces 30,32. The heads 28 on each of the legs 26 are similar but are directed in opposite directions so as to face one another.

The legs 26 are received within channels 34 formed in the other of the plastic extrusions identified as a retaining strip 36. The retaining strip 36 has a central web 38 with the channels 34 located at opposite ends of the web. Channel 34 is defined by a pair of spaced parallel limbs 40,42, the inner of which 40 includes an enlarged head 44 having upper and lower inclined surfaces 46,48.

The outer limb 42 has a terminal portion 50 that is outwardly flared to increase the width of the entrance to the channel 34.

A pair of planar surfaces 52 are formed on the retaining strip 36 on the opposite side to the channels 34. A double sided adhesive strip 54 such as that available from 3M is adhered to each of the planar surfaces 52 and presents an adhesive surface directed toward the outer surface of the panel 16. A protective film covers the adhesive surface until the trim piece 18 is to be placed on the panel 16.

It will be appreciated that the trim 18 and retaining strip 36 are each extruded from suitable plastics material and cut to the desired length for attachment to the appropriate panel 16.

In order to secure the trim piece 18 to the panel 16, the trim piece 18 is first assembled. The legs 26 on cover 19 are inserted into the channels 34 of retaining strip 36 so that the upper surface 30 of the head 28 engages the lower surface 48 of the head 44. During insertion, the outwardly inclined terminal portion 40 acts to guide the legs into the channel 34 so that the first and second complementary formations constituted by the heads 28 and 44 are interengaged. The adhesive strips 54 are then placed on the planar surfaces 42 with the protective film on the adhesive of the outwardly directed surface of the strip 54. The trim piece 18 may thus be supplied to the assembly line ready to be attached to the panel 16.

At the appropriate time, the film is removed from the adhesive surface so that the trim piece 18 can be adhered in an appropriate location to the panel 16. Because the trim piece 18 is preassembled, it can be carefully positioned to compensate for any small discrepancies that may exist in the fit of the body panel.

The flanges 20,22 are dimensioned so that they are firmly pressed against the panel 16 and slightly flex the trim when the adhesive is adhered to the panel 16. The adhesive strips 54 thus hold teh trim piece 18 firmly on the panel 16 with the flanges 20,22 providing a wall between the panel 16 and trim piece 18 to inhibit water collecting behind the cover 19.

If the trim piece 18 is superficially damaged, the cover 19 may be removed and replaced without removing the retaining strip 36. The legs 26 on cover 19 may be pulled out of channels 34 on the strip 36 as the limbs 40,42 are slightly resilient. Moreover, the inclined interengaging surfaces 30,48 assist in separation of the limbs 40,42 as the cover is peeled from one end to the other. The adhesive strip 52 holds the retaining strip on the panel 16 so that the retaining strip 36 can receive a new cover 19 of identical formation.

Figure 4:
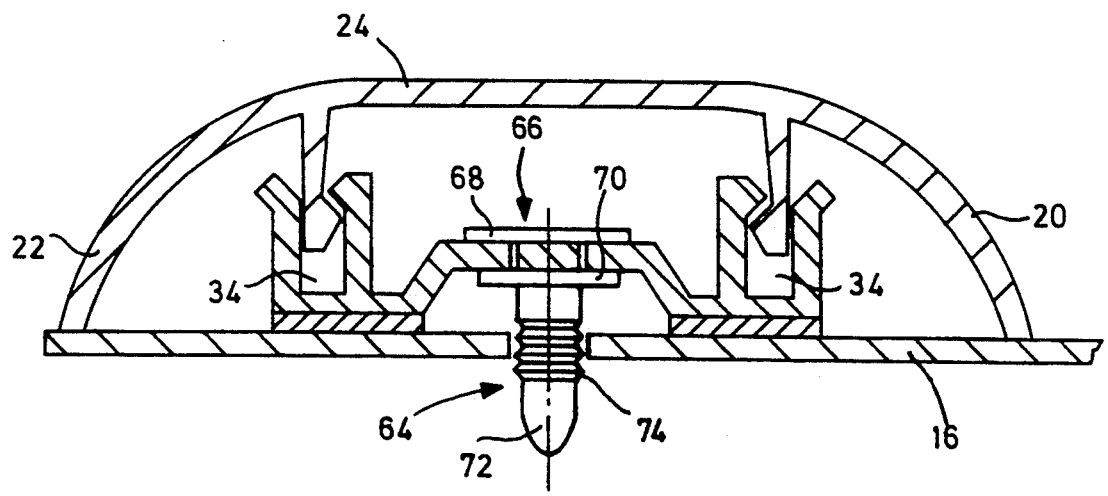
FIG. 4 is a view on the line 4—4 of FIG. 2.
Figure 5:
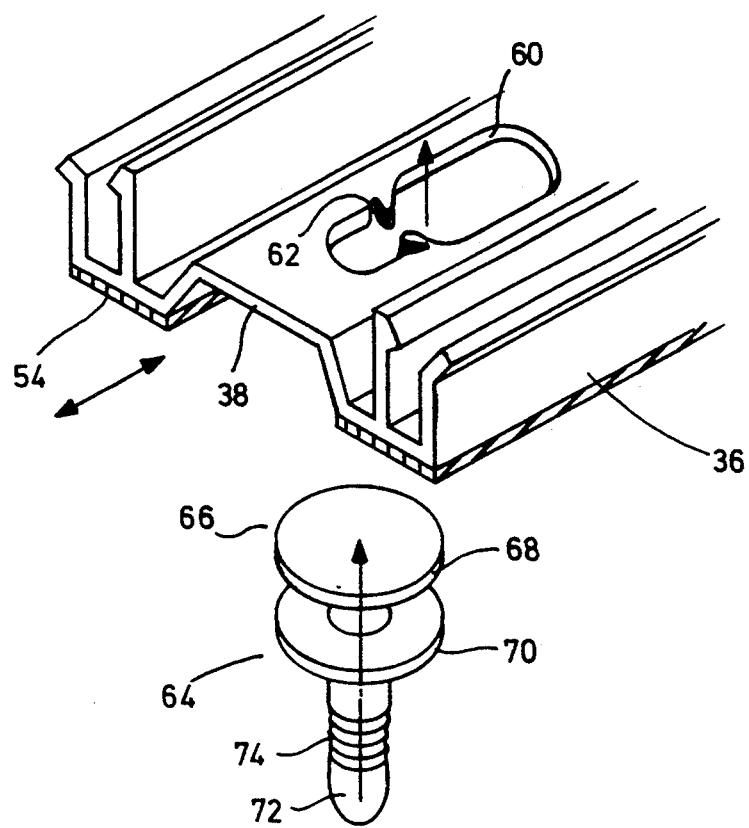
FIG. 5 is an exploded perspective view of the components shown in FIG. 4.

In order to secure the opposite ends of the trim piece 18 to the panel 16 and prevent unintentional removal of the trim piece 18, an additional fastening device is provided at each end. This is shown more clearly in FIGS. 4 and 5 where it will be noted that the web 38 includes a key hole slot 60 including a pair of resilient barbs 62 at the transition between the wider portion 61 and narrower portion 63 of the slot 60. A plastic stud 64 includes a head 66 formed from a pair of spaced circular disks 68,70 and a shank 72. Depending from the head 66 with circumferential nibs 74. The stud 64 is inserted into the slot 60 with the web 38 positioned between the spaced circular disks 68,70. Stud 64 may then be slid into the narrower portion of slot 60, past the resilient barb 62 so as to be retained within the slot 60. The narrower portion 63 is dimensioned to allow limited movement of the stud 64 both longitudinally and laterally relative to the web 38. The enlarge heads 66 provided by disks 68,70 accomodates this movement while preventing axial movement of stud 64 relative to the web 38.

When the trim piece 18 is placed on the panel 16, shank 72 is aligned with a pair of apertures formed at appropriate locations in the door panel 16 and the trim piece and retainer strip forced against the door such that the ribs 74 engage with the periphery of the aperture in the door panel 16 as the adhesive strip engages the door panel 16. The movement provided between the stud 64 and web 28 allows the trim to be positioned accurately on the panel 16. It will be noted that the stud 64 may be assembled and inserted with the cover 19 mounted on the retaining strip 36 to simplify assembly. Moreover, the cover 19 may still be removed without disturbing the stud 64 if repair is necessary.

With the arrangement shown in FIGS. 1 through 5, accurate placement of the trim pieces 18 is possible on a vehicle by vehicle basis as minor discrepancies between the alignment of the panels can be accomodated through adjustment of the trim pieces as they are attached. It will be noted that the panel 16 does not need to be formed with welded studs or other fastenings which simplifies production and decreases the time required to attach the trim to the vehicle. Moreover, the trim 18 and retaining strip 36 may be supplied as an assembled unit to the vehicle requiring only the application of the trim piece 18 to the vehicle in the desired location.

Figure 7:
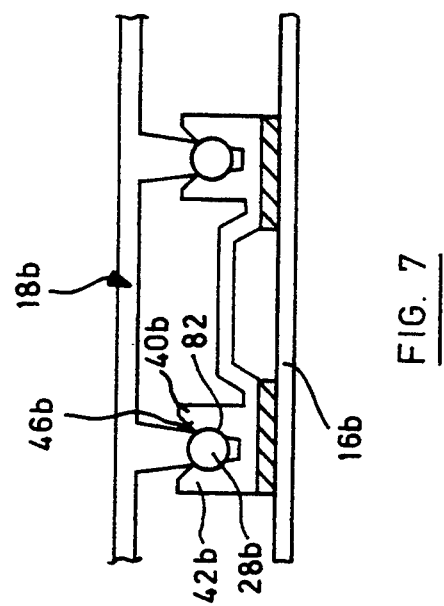
FIG. 7 is a view similar to FIG. 3 of a further embodiment.
Figure 6:
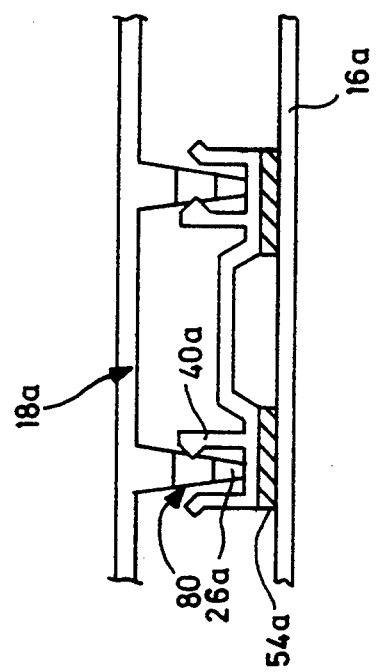
FIG. 6 is a view similar to FIG. 3 of a second embodiment.

Alternative configurations of limbs 26 and retaining strip 36 are shown in FIGS. 6 and 7 in which like references numerals will be used to denote like components but with a suffix "a" and "b)" respectively added for clarity of description. In the arrangement shown in FIG. 6, the limbs 26a progressively taper and have slots 80 formed periodically along the length of the legs. Inner limb 40a is provided with an enlarged head at locations corresponding to the locations of the slots 80 in the legs 26a. The cover 19a of trim piece 18a is thus held to the retaining strip 36a at a plurality of spaced locations along the length of the strip. This configuration permits existing trim sections to be used that would conventionally be attached with individual spaced clips each engaging one of the slots 80.

In the arrangement of FIG. 7, legs 26b terminate in circular heads 28b. Limbs 40b and 42b are each formed with a semi-circular recess 82 in their inwardly directed flank to receive the circular head 28b. The upper surfaces 46b,50b of the limbs 40b,42b respectively are each flared outwardly so as to facilitate insertion of the legs 26b into the channels 34b.

Figure 8:
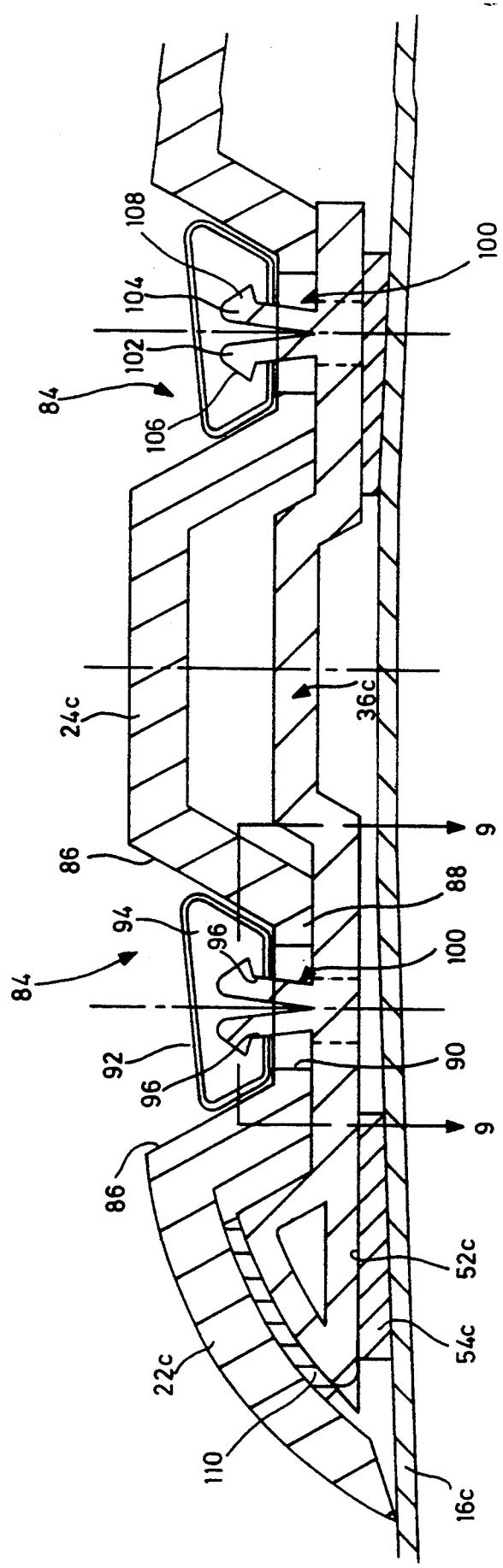
FIG. 8 is a view similar to FIG. 3 showing a further embodiment that utilizes additional components.

FIG. 8 discloses an embodiment in which an inlay of contrasting material is provided within the cover 19 of the trim piece 18. Again, like reference numerals will be used to describe components similar to that of the embodiment shown in FIGS. 2–5 with a suffix "c" added for clarity. In the arrangement shown in FIG. 8, the body portion 24c includes a pair of elongate recesses 84 having converging flanks 86 and a base 88. An elongate slot 90 is provided in the base 88 of the recess 84. An inlay 92 is located within the recess 84 and consists typically of a rolled metal section of contrasting material. This section will appear as an elongate strip extending along the length of the trim portion 18. The inlay 92 is rolled to provide a hollow interior 94 with opposite edges of the section indicated at 96 being spaced apart on the underside of the inlay. The spacing between the opposite edges 96 overlies the slot 90.

Retaining strip 36c is formed with a pair of upstanding bifurcated ribs 100 located so as to be aligned with the slot 90 in the base 88. The rib 100 has first and second legs 102,104 respectively, each of which has an enlarged outwardly directed head 106,108. As can be seen more fully in FIG. 9, the legs 102,104 and their associated heads 106,108 are staggered relative to one another along the length of the rib 100 so that relative movement between the legs 102,104 to bring the heads 106,108 into alignment is provided.

Planar surface 52c is provided on the retaining strip 36c to accomodate the adhesive strip 54c. It will be noted in FIG. 8 that additional support is provided for the flanges 22c of cover 19c by forming one edge of the retaining strip 36c with a complementary formation to the inner surface of flange 22c with a resilient spacer 110 located between the two formations.

In operation, the trim piece 18c is assembled with the rib 100 projecting through the slot 90 in the base of recess 84. Inlay 92 is then pushed over the heads 106,108 until the heads project into the interior 96 and retain the inlay 92 within the recess 84. This arrangement not only retains the body portion 24c on the retaining strip 36c but also permits limited longitudinal movement between the inlay 92 and the body portion 24c to accomodate movement due to temperature variations and the like. It will be understood that slot 90 and ribs 100 may be interrupted periodically to provide the necessary structural integrity for the cover 19c.

A similar arrangement is shown in FIG. 10 in which suffix "d" will be used to indicate components similar to those previously described. In the arrangement of FIG. 10, the retaining strip 36d includes a pair of upstanding legs 120,122 each having an enlarged head 124,126 respectively. The body 24d is formed with a recess 84d in which an inlay 92d is located. The heads 124,126 of the legs 120,122 project into the interior 96d of the inlay 92d to hold the trim panel 18d onto the retaining strip 36d.

A similar arrangement is shown in FIG. 11 in which the heads 124,126 are each formed as a hook so as to be more resilient than the arrangement shown in FIG. 10.

As may be seen from FIG. 12, the retaining strip 36e shown in FIG. 11 may also be used to retain a rolled metal trim strip 130 similar to that used as an inlay 92.

It will be seen therefore that in each embodiment, an arrangement is provided through the use of the retaining strip 36 which permits the adhesive strips 54 to be utilized to secure the trim panel 18 to the panels of the vehicle whilst at the same time allowing removal of the trim as necessary. It will be appreciated that whilst the embodiments have been described with particular reference to the door panel 16, similar arrangements can be utilized on the various panels of the vehicle as clearly shown in FIG. 1. Likewise, the retaining studs 64 may be used with each of the embodiments shown to secure the retaining strip 36c to the panel.

We claim:

1. A system for attaching a trim piece to a panel, comprising a trim piece including a cover having a first set of formations directed toward said panel, and a retaining strip including a second set of formations complementary to the first and adapted to engage releasably the first set of formations, one of said sets of formations including a channel having a pair of spaced limbs and the other of said sets of formations including a leg to be received within said channel between said limbs, said leg and one of said limbs each having a head formed at the respective distal ends thereof, said heads having complementary inclined surfaces extending away from said panel and juxtaposed when said leg is received between said limbs, the other of said limbs being outwardly flared away from said one limb to direct said head of said leg into said channel during movement of said cover toward said retaining strip, said system further comprising a planar surface on said retaining strip directed oppositely to the second set of formations, an adhesive strip secured to the planar surface and having an outer adhesive surface directed toward the panel to which the trim piece is to be attached.

2. A system according to claim 1 in which said first set of formations includes said leg projecting from said one side of the trim piece and having an enlarged head at one end and said second set of formations includes said channel to receive said head and inhibit separation of said sets of formations, said inclined surfaces promoting separation of said limbs upon application of a force sufficient to separate said cover and said retaining strip.

3. A system according to claim 1 wherein said cover includes a trim panel and an inlay extending across an aperture in said trim panel, said first set of formations being formed in said inlay, with interengaged sets of formations extending through said apertures to secure said fastening strip and said cover to one another.

4. A system according to claim 3 wherein said first set of formations is a re-entrant channel formed on said inlay and said second set of formations includes ribs extending through said apertures and into said channel.

5. A system according to claim 1 wherein a plurality of studs are provided on said retaining strip and directly outwardly of said planar surface, said studs being received in apertures in said panel.

6. A system according to claim 5 wherein said studs are releasably attached to said retaining strip.

7. A system according to claim 6 wherein limited movement is permitted between said studs and said retaining strip in the plane of said strip to allow adjustment of said stud on said retaining strip.

8. A system according to claim 1 wherein said cover is flexible and has a pair of flanges extending bilaterally beyond said retaining strip to engage said panel.

9. A system according to claim 8 wherein a resilient member is interposed between at least one of said flanges and said retaining strip to provide support for said flange.

10. A system according to claim 4 wherein each of said ribs includes an enlarged head and alternate heads are oppositely directed.

* * * * *